US010237300B2

(12) United States Patent
Gazit et al.

(10) Patent No.: US 10,237,300 B2
(45) Date of Patent: Mar. 19, 2019

(54) SYSTEM AND METHOD FOR DETECTING DIRECTED CYBER-ATTACKS TARGETING A PARTICULAR SET OF CLOUD BASED MACHINES

(71) Applicant: Microsoft Technology Licensing, LLC, Redmond, WA (US)

(72) Inventors: Jonathan Gazit, Tel Aviv (IL); Moshe Israel, Herzliya (IL); Hani Hana Neuvirth, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/481,159

(22) Filed: Apr. 6, 2017

(65) Prior Publication Data

US 2018/0295149 A1 Oct. 11, 2018

(51) Int. Cl.
*H04L 29/06* (2006.01)
(52) U.S. Cl.
CPC ...... *H04L 63/1441* (2013.01); *H04L 63/1425* (2013.01); *H04L 63/0281* (2013.01); *H04L 63/145* (2013.01)
(58) Field of Classification Search
None
See application file for complete search history.

(56) References Cited

U.S. PATENT DOCUMENTS 6,353,385 B1 *  3/2002  Molini ............... G08B 25/00
                                                        340/502
7,352,280 B1    4/2008  Rockwood
7,603,711 B2   10/2009  Scheidell
8,613,089 B1   12/2013  Holloway et al.
9,104,870 B1    8/2015  Qu et al.
(Continued)

FOREIGN PATENT DOCUMENTS

EP      3079336 A1    10/2016
WO   2016032491 A1     3/2016

OTHER PUBLICATIONS

"Security 11—Part 3—Various types of network attacks", http://www.symantec.corn/connect/articles/security-11-part-3-various-types-network-attacks, Published on: Dec. 27, 2013, 12 pages.
(Continued)

*Primary Examiner* — Benjamin E Lanier
(74) *Attorney, Agent, or Firm* — Workman Nydegger (57) ABSTRACT

A system for detecting a targeted attack by a first machine on a second machine is provided. The system includes an application including instructions to: according to first parameters, group alerts for attacking machines; each group of alerts corresponds to attacks performed by a respective one of the attacking machines, and each of the alerts is indicative of a possible attack performed by one of the attacking machines; according to second parameters, group metadata corresponding to attacked machines implementing cloud applications; based on the group of metadata corresponding to the second machine and one or more co-factors, evaluate one or more alerts corresponding to attacks performed by the first machine on the second machine relative to alerts associated with attacks performed by the first machine on other machines or attacks performed by the attacking machines; and alert the second machine of the targeted attack.

32 Claims, 5 Drawing Sheets

(56) References Cited

U.S. PATENT DOCUMENTS

| | | | |
|---|---|---|---|
| 9,141,790 B2 | 9/2015 | Roundy et al. | |
| 9,645,999 B1* | 5/2017 | Ciulla | G06F 17/2785 |
| 2003/0208616 A1* | 11/2003 | Laing | H04L 43/50 |
| | | | 709/236 |
| 2004/0044912 A1* | 3/2004 | Connary | H04L 43/045 |
| | | | 726/23 |
| 2009/0077666 A1* | 3/2009 | Chen | G06F 21/577 |
| | | | 726/25 |
| 2009/0174551 A1* | 7/2009 | Quinn | G06F 21/552 |
| | | | 340/540 |
| 2011/0173699 A1* | 7/2011 | Figlin | H04L 63/1408 |
| | | | 726/23 |
| 2011/0179492 A1* | 7/2011 | Markopoulou | G06F 21/552 |
| | | | 726/25 |
| 2015/0074806 A1 | 3/2015 | Roundy et al. | |
| 2015/0106930 A1 | 4/2015 | Honda et al. | |
| 2015/0163242 A1* | 6/2015 | Laidlaw | G06F 21/552 |
| | | | 726/22 |
| 2015/0237068 A1 | 8/2015 | Sandke et al. | |
| 2016/0036837 A1 | 2/2016 | Jain et al. | |
| 2016/0103992 A1 | 4/2016 | Roundy et al. | |

OTHER PUBLICATIONS

"International Search Report & Written Opinion Issued in PCT Application No. PCT/US2018/024988", dated Jun. 8, 2018, 13 Pages.

* cited by examiner

SYSTEM AND METHOD FOR DETECTING DIRECTED CYBER-ATTACKS TARGETING A PARTICULAR SET OF CLOUD BASED MACHINES

FIELD

The present disclosure relates to security applications, and more particularly to detecting directed cyber-attacks targeted at a particular set of cloud based machines.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

In other features, a system for detecting a directed targeted attack by a first machine on a second machine is provided. The second machine is implemented in a server computer of a service provider. The system includes an application including instructions configured to according to a first one or more parameters, group alerts for attacking machines, where: the attacking machines include the first machine; each group of alerts corresponds to attacks performed by a respective one of the attacking machines; and each of the alerts is indicative of a possible attack performed by one of the attacking machines. The instructions are further configured to: according to a second one or more parameters, group metadata corresponding to attacked machines implementing cloud applications, where the attacked machines include the second machine; and based on the group of metadata corresponding to the second machine and one or more co-factors, evaluate one or more alerts corresponding to attacks performed by the first machine on the second machine relative to at least one of (i) alerts associated with attacks performed by the first machine on machines other than the second machine, or (ii) alerts associated with attacks performed by the attacking machines. The instructions are further configured to alert the second machine of the directed targeted attack based on a result of the evaluation.

In other features, a system for detecting a directed targeted attack by a first set of machines on a second set of machines, where the second set of machines are implemented in a cloud-based network of a service provider. The system includes a processor, a memory and an application. The application is stored in the memory and including instructions, which are executable by the processor and that are configured to: according to a first one or more parameters, group alerts for attacking machines, where the attacking machines includes the first set of machines, where each group of alerts corresponds to attacks performed by a respective one of the first machines, and where each of the alerts is indicative of a possible attack performed by one of the attacking machines; and according to a second one or more parameters, group metadata corresponding to attacked machines implementing cloud applications, where the attacked machines include the second set of machines. The instructions are further configured to: based on the group of metadata corresponding to the second set of machines, and one or more co-factors, evaluate one or more alerts corresponding to attacks performed by the first set of machines on the second set of machines relative to at least one of (i) alerts associated with attacks performed by the first set of machines on machines other than the second set of machines, or (ii) alerts associated with attacks performed by the attacking machines; and alert a customer associated with the second set of machines of the directed targeted attack based on a result of the evaluation.

In other features, a non-transitory tangible computer readable medium is provided and stores instructions executable by a processor for detecting a directed targeted attack by a first machine on a second machine. The second machine is implemented in a server computer and the server computer is implemented in a cloud-based network of a service provider. The instructions are for: according to a first one or more parameters, grouping alerts for attacking machines, where the attacking machines include the first machine, where each group of alerts corresponds to attacks performed by a respective one of the attacking machines, and where each of the alerts is indicative of a possible attack performed by one of the attacking machines; and according to a second one or more parameters, grouping metadata corresponding to attacked machines implementing cloud applications, where the attacked machines include the second machine. The instructions are further configured to: based on the group of metadata corresponding to the second machine and one or more co-factors, evaluating one or more alerts corresponding to attacks performed by the first machine on the second machine relative to at least one of (i) alerts associated with attacks performed by the first machine on machines other than the second machine, or (ii) alerts associated with attacks performed by the attacking machines; and alerting the second machine of the directed targeted attack based on a result of the evaluation.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A security application of a cloud-based network can monitor, for example, traffic to and from PMs and VMs of the cloud-based network. This may include monitoring traffic between client computers of organizations and accessed applications implemented by the PMs and VMs. The security application detects anomalies in traffic patterns and generates alerts, which may be provided to a security administrator. The security administrator may receive numerous alerts. As a result, the security administrator may prioritize importance of the alerts and investigate alerts with a high priority level. The prioritization may be based on severity of the alert. The severity refers to a level of the potentially negative effects associated with the attack. A severity level may indicate whether, for example, personal data has likely been accessed, malicious code has been installed, software and/or data have been compromised, information has been stolen, etc. The alerts having a high severity level may be reported to a customer. The alerts having a low severity level may be ignored and are often not reported to a customer.

As disclosed herein and in addition to information reported in high severity alerts, information reported in low severity alerts can also be used as an indicator of a targeted attack. A targeted attack (also referred to herein as a "directed targeted attack") refers to an attack that is directed at a particular entity or group of entities, where an entity refers to a PM or a VM. For example, a targeted attacked may be directed at a user device, a group of user devices, a particular tenant (e.g., customer and/or business), VMs and/or PMs of a subscription, VMs and/or PMs executing a particular cloud application, VMs and/or PMs of an industry, VMs and/or PMs in a geographical area (e.g., a city, state or country), etc. A subscription may refer to, for example, one or more resources, a container, a set of machines, a logic subset of machines of a business, and/or a business unit. A business unit includes a set of PMs and/or VMs of a tenant. A cloud service provider provisions resources (such as software applications having corresponding executable code, server computer processing time, and/or storage) via the cloud-based network. Cloud service providers implement infrastructure as a service (IaaS) and platform as a service (PaaS) using VMs or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines.

A targeted attack does not refer to a cyber-attack (or non-targeted attack) performed by an attacking machine that is searching the Internet for any machine for which the attacking machine can obtain access and control. This type of attack typically includes the attacking machine probing the Internet to obtain access and control of any machine. The attacking machine typically has a pattern of attack, uses a same library of passwords, performs attacks a certain times of day, performs attacks in a periodic pattern, etc. In general, non-targeted attacks continuously occur on most if not all machines that can be accessed via the Internet. If the machines being attacked have proper basic security software installed, these types of attacks are blocked and are not of importance. The non-targeted attacks are considered low severity attacks and alerts associated with these attacks provide low security value. As an example, in port scanning reconnaissance each port scanning activity has low severity since a large number of attackers are continuously and widely scanning a cloud-based network. Machines that experience non-targeted attacks and/or corresponding users, customers, and/or owners are often not alerted of the non-targeted attacks.

Basic security protection software can typically be used to block non-targeted attacks, whereas more sophisticated software is needed to block targeted attacks. This is because targeted attacks are more difficult to block than non-targeted attacks. An attacker performing a targeted attack typically invests a lot of resources to perform the attack. This may include: spending a large amount of time performing the attack; conducting the attack via a large number of machines; transferring a large amount of data and/or signals between one or more attacking machines and the one or more entities being attacked; etc. A targeted attack is more focused than a non-targeted attack and often includes the stealing of data, information, and/or causing harm to the one or more entities being attacked.

The distinction between a targeted attack and a non-targeted attack may not be readily apparent. As an example, if an attacker scans Internet protocol (IP) addresses of VMs belonging to a customer, the attack may be a targeted attack or a non-targeted attack. If the scanning of the VMs is a coincidence, then the attack is a non-targeted attack. If the attacker is periodically or randomly scanning groups of IP addresses and during a certain period of time the attacker scans the IP addresses of the VMs of concern, then the attack is a non-targeted attack. Attackers performing non-targeted attacks usually perform a shallow scan over many victims (i.e. entities being attacked) attempting to affect any machine accessible. Alerts associated with these types of attacks are typically considered as noise and have low security value.

If however the scanning of the VMs is specifically directed at the VMs and other VMs, such as VMs outside a targeted group, are not attacked, then the attack is a targeted attack. Although this type of scanning may have a low severity level, the low severity alerts associated with this type of scanning can have a high security value. Current port scanning software allows scanning random IP addresses in addition to sequences of IP addresses. Attackers often scan hundreds or even thousands of IP addresses. Thus, the scanning of only a certain set of VMs of concern can be an indicator that a targeted attack has occurred. As another example, if all of the VMs of concern are communicating with a same known malicious IP address belonging to a same customer, then the attack may be a targeted attack. Persistent and/or orchestrated collaboration of malicious activities may be monitored and indicate a targeted attack has occurred. Alerts associated with targeted attacks provide a high security value. One example reason for a targeted attack is the stealing of credit card information. The targeted attack may be directed to one or more individuals and/or individuals that shop at a certain store. A security breach at a company can cause a large amount of money to be spent curing the breach and negative effects of the breach including repairing a reputation of the company.

By determining whether an attack is a targeted attack, appropriate countermeasures can be performed and/or customers can be alerted of the targeted attack and can then respond by performing the appropriate actions to block the attack. The embodiments disclosed herein include receiving and evaluating both high severity alerts and low severity alerts to determine if a targeted attack has occurred. The embodiments set forth herein detect and distinguish a targeted attack from a non-targeted attack. The embodiments include alerting customers of targeted attacks.

Figure 1:
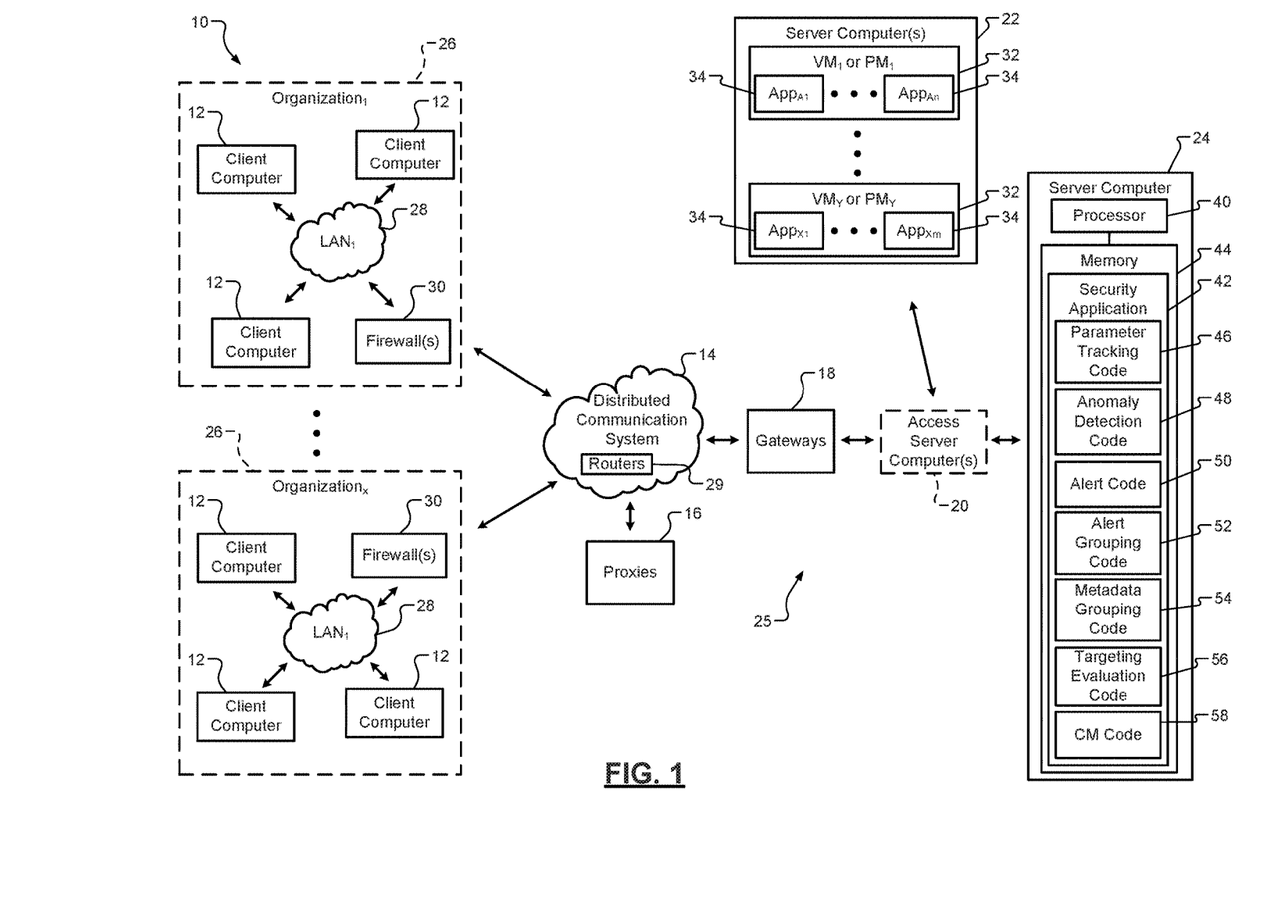
FIG. 1 is a functional block diagram of an example of a security system including a security application in accordance with an embodiment of the present disclosure.

FIG. 1 shows a security system 10 that may include client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. In some examples, the server computer 24 is implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 26. The organizations 26 may include local area networks (LANs) 28 and firewalls 30. The client computers 12 may access the distributed communication system 14 directly and/or via the LANs 28 and firewalls 30. The distributed communication system 14 may include routers 29.

The cloud-based network 25 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network 25 as VMs and/or PMs 32 or can be located on premises. The network appliances and application server computers may be implemented as one or more VMs of the cloud-based network 25.

The cloud-based network 25 may include one or more of the server computers 22, 24. The cloud-based network 25 further includes resources and/or containers that may be shared by the client computers 12. The cloud service provider provisions the resources (such as software applications having corresponding executable code, server computer processing time, and/or storage) via the cloud-based network 25. The server computers 22, 24 may include VMs (e.g., VMs$_{1-Y}$ are shown), which may be implemented as PMs (e.g., PMs$_{1-Y}$). The software applications may be implemented on the server computers 22, 24, which may be referred to as physical machines.

The client computers 12 may be privately owned by different individuals and/or entities. In the example shown, the client computers 12 are owned by organizations 26. Each of the client computers 12 may access one or more cloud applications 34 stored in the server computers 22 and/or VMs 32. The organizations 26 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 26 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computer 24 to the client computers 12. The gateways 18, the access server computers 20, the server computers 22 and/or the server computers 24 may be implemented in an internal network of a service provider that provides software applications.

The server computer 24 includes a processor 40 that executes software applications, such as a security application 42, which is stored in a memory 44. One or more of the VMs 32 may be implemented in the server computer 24. The security application 42 includes parameter tracking code 46, anomaly detection code 48, alert code 50, alert grouping code 52, metadata grouping code 54, targeting evaluation code 56, and countermeasure (CM) code 58.

The security application 42 may be provided as a service application by the service provider and used to monitor cloud applications implemented in the cloud-based network 25. The security application 42 monitors behavior of the client computers 12 and/or users of the client computers 12 directed to access of the cloud applications 34 and VMs/PMs 32. The client computers 12 may access the security application 42 via a web browser and corresponding website. The security application 42 collects data, parameters, risk factors, and/or information associated with the behavior and detects anomalies. The security application 42 may monitor, for example, traffic between client computers of organizations and accessed cloud applications, VMs and PMs. The security application 42 monitors information, such as data, logs, parameters, risk factors and/or other information associated with access of the cloud applications, VMs and PMs. The security application 42 detects anomalies based on the information. Based on the information, alerts are generated, which may include the information and/or other information derived therefrom.

The security application 42 also performs a targeting detection method based on the alerts and the parameters to determine whether an attack is a targeted attack. The parameter tracking code 46 is implemented to track the parameters. The parameters include first parameters and second parameters. The first parameters include: IPs of attack entities; user identifiers (IDs) of attacking entities; customer IPs of attacking entities; identifications of attacking tools (e.g., Amap, an attack script, or other attack or scanning based tools) used by attacking entities; a botnet ID; a geographical area of origin of attacker and/or attacking entities; attack pattern information, such as traffic flow rates, number of accesses in a predetermined period of time, timing of accesses, spikes in traffic flow rates, etc.; customer port IDs; and/or other parameters. The second parameters include: tenant IDs; service subscription IDs; an ID of a domain of operation; an ID of an industry (e.g., health care industry, automotive industry, mobile communication industry, etc.) of the tenant; an ID of a geographical area of the tenant; IDs of geographical areas of origin of users of attacked entities; and/or other IDs for different sets of entities being attacked.

The anomaly detection code 48 may be executed to detect the state anomalies. The alert code 50 may be executed to generate first alerts based on the anomalies and/or corresponding information. The alert grouping code 52 may be executed to group the alerts as is further described below. The metadata grouping code 54 may be executed to group metadata of users and/or entities as further described below. The metadata may include, for example: IP addresses and/or IDs of entities being attacked; user IDs of the entities being attacked; IP addresses and/or IDs of tenants being attacked; IDs of service subscriptions being attacked; IDs of domain of operations being attacked; IDs of geographical areas of origin being attacked; IDs of industries being attacked; and/or other metadata of a set of users and/or entities under attack. The targeting evaluation code 56 may be executed to evaluate alerts associated with a first one or more attacking entities attacking a first set of attacked entities relative to (i) alerts associated with the first one or more attacking entities attacking other sets of attacked entities, and/or (ii) alerts associated with other attacking entities attacking the first set of attacked entities and/or other sets of attacked entities. The attacking entities may refer to client computers and/or non-client computers outside the cloud-based network 25 and/or VMs and PMs 32 in the cloud-based network 25. The attacking entities may be VMs and/or PMs controlled by an attacker and allocated to a customer and/or non-attacker. In one embodiment, the attacked entities refer to the VMs and PMs 32 being attacked in the cloud-based network 25. The CM code 58 may be executed to generate targeted alerts and/or perform other countermeasures as described below.

Figure 2:
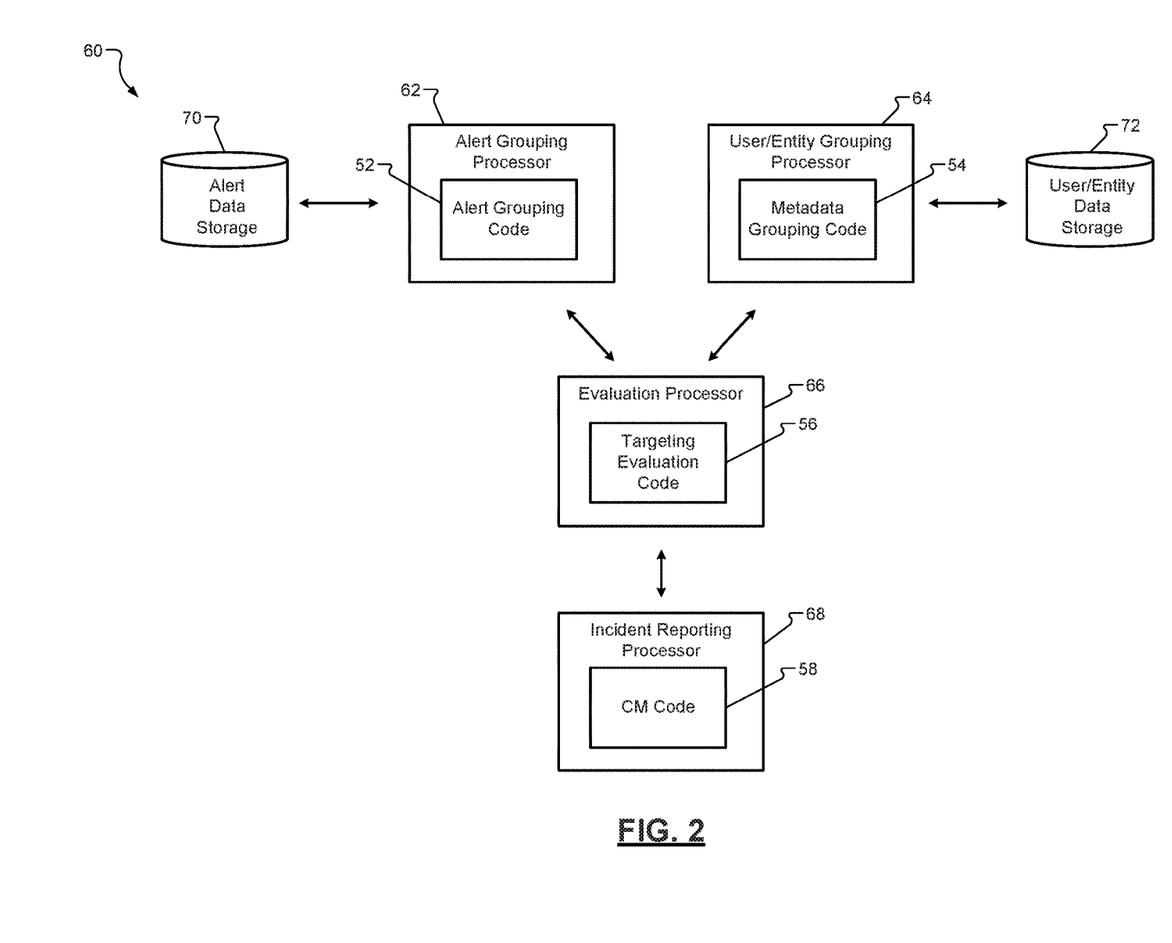
FIG. 2 is a functional block diagram of an example of a targeting detection system in accordance with an embodiment of the present disclosure.

FIG. 2 shows a targeting detection system 60 that includes an alert grouping processor 62, a user/entity grouping processor 64, an evaluation processor 66, and an incident reporting processor 68. The alert grouping processor 62 may execute the alert grouping code 52 to group alerts for attacking entities based on the above-described first parameters. The first parameters may be stored in an alert data storage 70 and accessed by the alert grouping processor 62. The user/entity grouping processor 64 may execute the metadata grouping code 54 to group metadata corresponding to attacked entities based on the above-described second parameters. The metadata and the second parameters may be stored in a user/entity data storage 72 and accessed by the user/entity grouping processor 64.

The evaluation processor 66 may execute the targeting evaluation code 56 to determine whether a targeting incident has occurred and/or has likely occurred. The incident reporting processor 68 may execute the CM code 58 to generate an alert of a targeting incident and/or to perform one or more other countermeasures to block further attacks by the one or more attacking entities associated with the targeting incident of concern.

The processors 62, 64, 66, 68 may be implemented in separate server computers or in a same processor computer. Although the processors 62, 64, 66, 68 are shown as separate processors, the processors 62, 64, 66, 68 may be implemented as a single processor (e.g., the processor 40 of FIG. 1). Also, although the alerts and the metadata are described as being stored in the data storages 70, 72, the alerts and metadata may be stored in memory of a server (e.g., the memory 44 of FIG. 1).

Operation of the processors 40, 62, 64, 66, 68 of FIGS. 1-2 is further described below with respect to the targeting detection method of FIG. 5. The security application 42 and the codes 46, 48, 50, 52, 54, 56, and 58 are further described below with respect to the method of FIG. 5.

Figure 3:
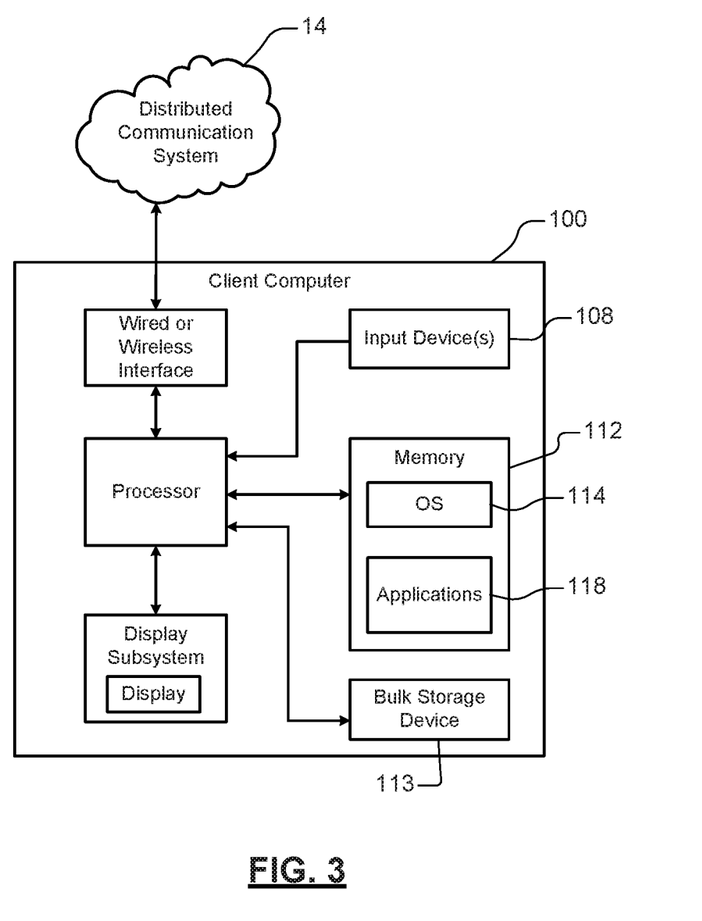
FIG. 3 is a functional block diagram of an example of a client computer in accordance with an embodiment of the present disclosure.

In FIG. 3, a simplified example of a client computer 100 is shown. The client computers 12 of FIG. 1 may be implemented as the client computer 100. The client computer 100 includes a central processing unit (CPU) or processor 104 and an input device 108 such as a keypad, touchpad, mouse, etc. The client computer 100 further includes memory 112 such as volatile or nonvolatile memory, cache or other type of memory. The client computer 100 further includes bulk storage device 113 such as flash memory, a hard disk drive (HDD) or other bulk storage device.

The processor 104 of the client computer 100 executes an operating system 114 and one or more applications 118. For example, the applications 118 may include a browser. The client computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 14. The client computer 100 further includes a display subsystem 124 including a display 126.

Figure 4:
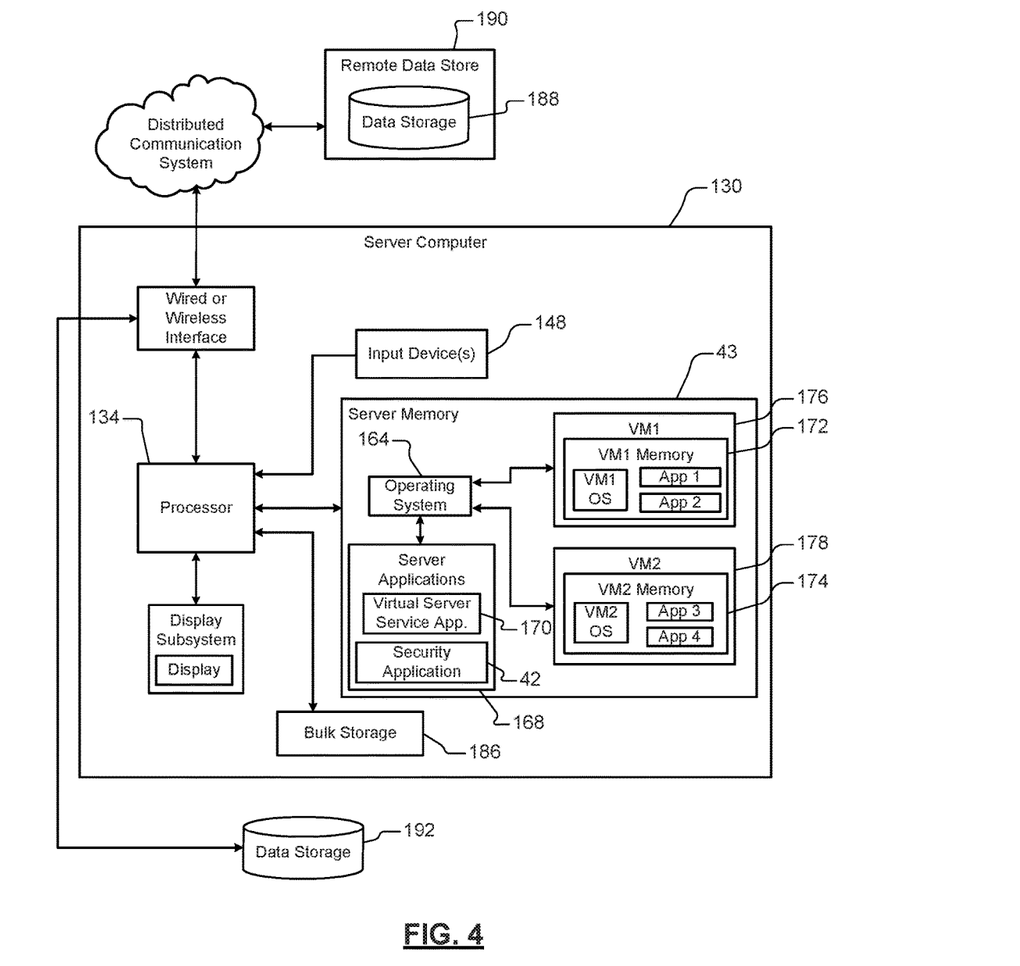
FIG. 4 is a functional block diagram of an example of a server computer incorporating applications in accordance with an embodiment of the present disclosure.

In FIG. 4, an example of a server computer 130 is shown. The server computers 20, 22, 24 of FIG. 1 may be implemented as and/or have similar architecture as the server computer 130. The server computer 130 includes one or more processors and an input device 148 such as a keypad, touchpad, mouse, etc. The server computer 130 further includes a server memory 132, such as volatile or nonvolatile memory, cache or other type of memory, and a processor 134. The processor 134 executes an operating system (OS) 164 and one or more server applications 168 and/or VM applications. Examples of server applications include the security application 42 and a virtual server service application 170, which is implemented in a virtualization layer and is executed along with the OS 164. The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, storage applications, productivity applications, and/or other VM applications. VM applications App 1-4 are shown as examples. Each of the VM memories may include one or more VM applications.

The server computer 130 further includes a wired or wireless interface 180 that establishes a communication channel over the distributed communication system 14. The server computer 130 further includes a display subsystem 182 that includes a display 184. The server computer 130 may further include a bulk storage device 186 such as flash memory, a hard disk drive (HDD) or other local or remote storage device. The processor 134 may also access a data storage 188 of a remote data store 190 via the interface 180 and the distributed communication system 14, or a data storage 192, such as a database, via the interface 180.

Operations of the client computers 12, proxies 16, gateways 18, server computers 20, 22, 24 and firewalls 30 of FIG. 1 are further described below with respect to the target detection method of FIG. 5. Although the following operations are primarily described with respect to the implementations of FIGS. 1-2, the operations may be modified to apply to other implementations of the present disclosure. The operations may be iteratively performed.

The method begins at 200 and includes execution of the security application 42 by the processor 40 and/or execution of the codes 52, 54, 56, 58 by the processors 62, 64, 66, 68. At 202, the security application 42 via the parameter tracking code 46 collects data, logs, packets, risk factors, the first parameters, the second parameters, and/or other related information associated with access of the cloud applications 34 and the VMs and/or PMs 32 of the cloud-based network 25. The related information is tracked over time and may be stored in the proxies 16, gateways 18, routers 29, firewalls 30, memories of the server computers 20, 22, 24, and/or data storage (e.g., the data storage 110, 112). As an example, a log of access information may include an access start time, an access end time, a duration of access, an IP address of a sending entity, an IP address of a receiving entity, a username, a cloud application name, an upload volume of data, a download volume of data, a number of transactions, a number of accesses, a number of accesses in a predetermined period, a geographical location where the access occurred, etc.

The security application 42 may request, receive, access, and/or track network activity, parameters and other related information from various sources. As a first example, the security application 42 collects network activity, parameters and other related information from Internet protocol version 6 (IPv6) conforming devices and/or entities. The IPv6 conforming device and/or entities may include the server computers 20, 22, 24, the VMs and/or PMs 32, and/or other IPv6 conforming devices and entities within the cloud-based network 25 and/or outside the cloud-based network 25. The IPv6 conforming devices log network activity between, for example, corresponding local area networks (LAN) and the Internet. As another example, one or more of the VMs and PMs 32 include an application (e.g., one or more of the applications 34) configured to operate as an agent, which reports network activity, parameters and other related information tracked to the security application 42. As yet another example, the security application 42 may collect network activity, parameters and other related information from "partners". In one embodiment, the partners include applications executed on the proxies 16, the gateways 18, the access server computers 20, the routers 29, and/or the firewalls 30.

The security application 42 may determine one or more parameters and/or risk factors to monitor. This determination may be performed prior to operation 202. The selected parameters and/or risk factors may be requested from the IPv6 conforming devices and/or entities, the agents, and/or the partners. The selected parameters and/or risk factors may include parameters and/or risk factors provided in the log of access information and/or parameters calculated based on the parameters and/or risk factors provided in the log of access information. Some examples of parameters and/or risk factors are: a user identifier; a client computer identifier; an address of the client computer; a cloud application identifier; a number of transactions between a user/client computer and one or more cloud applications; an amount of traffic between a user/client computer and one or more cloud applications; a number of transactions between a user/client computer and one or more cloud applications with a predetermined period of time; an amount of traffic between a user/client computer and one or more cloud applications within a predetermined period of time; periods of use of one or more cloud applications by a user/client computer; a total number of cloud applications accessed by a user/client computer; and a total number of cloud applications accessed by a user/client computer within a predetermined period of time.

Some of the parameters are risk factors, such as the: number of transactions between a user/client computer and one or more cloud applications; amount of traffic between a user/client computer and one or more cloud applications; number of transactions between a user/client computer and one or more cloud applications with a predetermined period of time; amount of traffic between a user/client computer and one or more cloud applications within a predetermined period of time; periods of use of one or more cloud applications by a user/client computer; total number of cloud applications accessed by a user/client computer; and total number of cloud applications accessed by a user/client computer within a predetermined period of time. Other parameters and risk factors include: geographical area of origin of a user and/or client computer; compliance of activity performed by a user and/or client computer; and a reputation of a user and/or client computer.

The one or more parameters and/or risk factors may be for one or more users/client computers, users/client computers of an organization, VMs and/or PMs of an organization, a predetermined group of users/client computers, and/or one or more cloud applications. The predetermined timer periods may be for one or more days. The monitored parameters may be monitored per user, per client computer, per cloud applications, per VM, per PM, and/or a combination thereof. The parameters and/or risk factors may be stored in tables in the memory 44 and accessed during the following operations.

In one embodiment, the security application 42 tracks the network activity, parameters, risk factors and/or other related information regardless of whether the corresponding customer has paid for security services provided by the server computer 24. The customer may have paid for cloud-based services and have allocated to the customer one or more corresponding VMs and/or PMs in the cloud-based network 25.

The following operations 204, 206 and 210 are shown for an example embodiment. In one embodiment, the operations 204, 206 and 210 are not performed and operation 208 is performed subsequent to operation 202.

At 204, the security application 42 may detect anomalies based on the network activity, parameters, risk factors and/or other related information. The security application 42 via the anomaly detection code 48 detects one or more anomalies based on baselines and the selected one or more parameters and/or risk factors. Different types of anomalies may be detected. Example anomalies are: a sudden increase in an amount of upload data, a number of login failures, an amount of download data, and/or a number of transactions of a particular user on a particular cloud application; a sudden increase in an amount of upload data, an amount of download data, and/or a number of transactions of users on a particular cloud application; a particular user uploading and/or downloading a predetermined amount more data than other users for a particular cloud application; a user conducting a predetermined amount more transactions than other users for a particular cloud application; a sudden increase in a number of users using a particular cloud application; and/or other anomalies.

In one embodiment, the security application 42 determines likelihood that values of the selected one or more parameters are to occur based on the baselines. For example, if a difference between a value and a corresponding mean is greater than a predetermined amount and a corresponding variance is low, then the value may be identified as an anomaly. If the difference between the value and the mean are greater than a predetermined amount and the variance is high, then the value may not be identified as an anomaly. The security application 42 via the anomaly detection code 48 stores the information corresponding to the identified anomalies in the memory 44. This information (or anomaly data) may include a user identifier, a client computer identifier, a cloud application identifier, a VM ID, a PM ID, corresponding IP addresses, an organization identifier, and/or one or more of the corresponding parameters. A single IP address of a customer may be an external IP address associated with one or more VMs and/or PMs of the customer. The VMs and/or PMs may also have internal IP addresses.

The security application 42 monitors activities of the VM and PMs by monitoring information, such as data, logs, parameters, and risk factors, associated with the packets transmitted to/from the VM and the PMs. Based on the information received, the security application 42 determines whether one or more of the users and/or client computers are attacking one or more of the cloud applications and/or corresponding VMs, PMs, and server computers. The security application 42 may determine whether one or more VMs and/or PMs are attacking other VMs and/or PMs. The security application 42 informs the owners of the VMs and PMs of malicious activity. This allows the owners, the VMs, and/or the PMs to take appropriate actions to prevent further attacks on and/or to block access to the cloud applications. Although the security application 42 is shown as being implemented in the server computer 24, the security application 42 may be implemented in the same server computer as one or more of the VMs.

The anomalies are detected including anomalies associated with access to cloud applications and/or machines in a cloud-based network. The examples include tracking activity to cloud applications and, based on the activity, detecting anomalies via a security application. The security application may be implemented in a cloud-based network and/or a network of a service provider and is used to monitor activity between (i) client computers and (ii) VMs and/or PMs of the cloud applications. The security application identifies cloud applications used by a network of an organization and provides risk scoring and risk assessment. The security application informs owners of client computers, VMs, PMs, organizations and/or service provider owners of detected anomalies, such that one or more countermeasures can then be performed.

At 206, the security application 42 evaluates the network activity, parameters, risk values, anomalies, and/or other related information to determine whether a countermeasure is to be performed. The security application 42 may determines risk values for the collected information. This may include determining probabilities that the anomalies are to occur based on the baselines, mean values, differences between the mean values and the values of the parameters of the anomalies, and/or variance values. The security application 42 determines a likelihood that an anomaly (or corresponding parameter and/or risk factor value) is to occur. The larger the likelihood, the larger the risk value. The values of the parameters of the anomalies may be weighted based on the type of anomaly. The unweighted anomalies and/or weighted anomalies are stored as aggregated anomaly data. The larger the weighting, the more likely the parameter and/or risk factor of the anomaly is a concern and/or associated with malicious activity. The security application 42 via the countermeasure code 58 determines whether the one or more parameters and/or risk values are greater than corresponding predetermined thresholds and/or outside corresponding predetermined ranges. If the one or more parameter values and/or risk values are greater than corresponding predetermined thresholds and/or outside corresponding predetermined ranges, operation 208 is performed, otherwise operation 210 may be performed.

The security application 42 monitors activities of the $VM_{1-N}$ and PMs by monitoring information, such as data, logs, parameters, and risk factors, associated with the packets transmitted to/from the $VM_{1-N}$ and the PMs. Based on the information received from the proxies 16, gateways 18, and firewalls 30, the security application 42 determines whether one or more of the users and/or client computers are attacking one or more of the cloud applications and/or corresponding VMs, PMs, and server computers. The security application 42 informs the owners of the VMs and PMs of malicious activity. This allows the owners, the VMs, and/or the PMs to take appropriate actions to prevent further attacks on and/or to block access to the cloud applications. Although the security application 42 is shown as being implemented in the server computer 24, the security application 42 may be implemented in the same server computer as one or more of the $VM_{1-N}$.

At 208, the security application 42 via the countermeasure code 58 performs one or more countermeasures. The security application 42 performs countermeasures (e.g., generates alerts) to prevent malicious activity based on results of the evaluation. The security application 42 displays at client computers one or more windows/pages via the web browser of statistical data associated with the information collected, the anomalies detected, models generated, and/or corresponding alerts. If for example, the anomalies are determined to be a high risk and/or associated with malicious activity, then a countermeasure may be performed to prevent further similar malicious activity.

As a first countermeasure, first alerts are generated to indicate the anomalies. As a second countermeasure, statistics associated with the anomalies are reported, which may include reporting the parameters and/or risk factors, identified anomalies, risk values, user/customer IDs, client computer IDs and/or addresses, cloud application IDs, VM IDs and/or IP addresses, PM IDs and/or IP addresses, an industry ID, an ID of a geographical area of origin of attacking entity, IDs of geographical areas of origin of entities being attacked, types and/or IDs of corresponding cloud applications, an organization ID, and/or other parameters disclosed herein and related statistic information. This information may be reported to corresponding users, client computers, owners and/or representatives of an organization, owners of VMs and/or PMs of cloud applications, and/or representatives of a service provider of the security application 42 and/or the cloud applications. Information provided in the reported alerts and/or statistics may be stored in the memory 44 and/or in the alert data storage 70 and later accessed at 212.

As another countermeasure, the security application 42 may alert a user, prevent the user from accessing one or more cloud applications from any of the client computers 12, and/or limit access of the user to the one or more cloud applications. As another countermeasure, the security application 42 may alert a client computer, prevent the client computer from accessing one or more cloud applications, and/or limit access of the client computer to the one or more cloud applications. As yet another example, the user and/or the client computer may be limited to operating the one or more cloud applications is a safe operating mode with limited functions. As another countermeasure, a VM and/or PM performing an attack may be limited in operations available to be performed and/or access to the VM and/or PM may be limited and/or presented. As another countermeasure, the security application 42 may provide owners of VMs and/or PMs with an alert and the statistic information. As another countermeasure, the security application 42 may provide a representative and/or owner of an organization and/or a service provider with an alert and the statistic information. In one embodiment, security alerts are generated for the riskiest anomaly groups. The above-described operations allow for risky behavior to be identified and reported.

At 210, the security application 42 via the countermeasure code 58 may report the parameters, anomalies, and/or other related statistic information to corresponding users, client computers, owners of VMs and/or PMs of cloud applications, owners and/or representatives of an organization, and/or representatives of a service provider of the security application 42 and/or the cloud applications.

At 212, the security application 42 and/or the alert grouping processor 62 via the alert grouping code 52 groups the alerts and/or corresponding statistical information generated at 208 by attacking sets, where each attacking set includes one or more attacking entities. In one embodiment, this grouping is performed based on the first parameters. Each group corresponds to attacks performed by one attacking entity or a set of attacking entities. Each group corresponds to one or more attackers. A set of attacking entities and/or a group of attackers may be collaborating and targeting a particular set of one or more entities being attacked. This grouping identifies the sets of attacking entities and corresponding alerts and/or statistical information.

At 214, the security application 42 and/or the user/entity grouping processor 64 via the metadata grouping code 52 groups metadata corresponding to the sets of entities being attacked. This grouping may be based on the second parameters. This grouping identifies the targeted entities. The type of the targeted entities indicates a targeted level of attack. For example, a low targeted level may be provided if the targeted entity is a geographical area, whereas a high targeted level may be provided if the targeted entity is a particular customer or small set of VMs and/or PMs associated with a particular customer and/or organization. The more isolated the targeting, the higher the targeted level. Depending on the customer and the targeted attack performed, a high targeted level may be more of a concern than a low targeted level.

At 216, the security application 42 and/or the evaluation processor 66 via the targeting evaluation code 52 evaluates the alerts, first parameters, the second parameters, the detected anomalies, and/or other statistical information based on the groupings provided at 212, 214. This may include determining a probability that the alerts associated with, for example, a first set of attacked entities is to occur. If the probability that the alerts are to occur for the first set of attacked entities as compared to the probability of the same or similar attacks occurring for other similar sets of attacked entities is high, then the probability that the first set of attacked entities has been targeted is low. However, if the probability that the alerts are to occur for the first set of attacked entities as compared to other attacked entities is low, then the probability that the first set of attacked entities has been targeted is high. In one embodiment, the probability that the same or similar attacks are to occur for other attacked entities is a probability that the same one or more attacking entities is to attack the other attacked entities in a same or similar manner as the first set of attacked entities. This may be determined by comparing attacks on the first set of attacked entities by the one or more attacking entities to attacks on the other attacked entities by the one or more attacking entities. The probability that the alerts are to occur for the first set of attacked entities may be determined based on the anomalies detected for the one or more attacked entities and/or detected for other attacked entities. These anomalies may include the anomalies detected at 204 and other anomalies described with respect to the examples provided herein.

The probability that the alerts are to occur for the first set of attacked entities may be determined and/or adjusted based on one or more co-factors. Examples of the co-factors are IP continuity, malware type, a list of known attackers, geographical areas (e.g., countries) of the first set of attacked entities and the corresponding one or more attacking entities, type of tenant (e.g., business) of the first set of attacked entities, industry of concern of the first set of attacked entities, size of the tenant, and/or other co-factors. IP continuity refers to whether a same entity, a same tenant, a same IP address or group of IP addresses, a same city, a same state, a same geographical area, and/or other set or group is being attacked continuously. In one embodiment, the co-factors include one or more of the first parameters and the second parameters.

In one embodiment, the probability that the alerts are to occur for the first set of attacked entities is determined using a predetermined distribution. The probability (or p-value) is indicative of whether an over-expression of attacks for the first set of attacked entities has occurred. The over-expression of attacked entities refers to when the number and/or level of attacks of the first set of attacked entities is higher than for other similar attacked entities (e.g., attacked entities of a same PM, type of customer, type of industry, geographical area, etc.

In one embodiment, a confidence score is determined. The confidences score may be based on a probability value that the alerts are to occur for the first set of attacked entities. As a first example, the confidence score is directly related to or derived based on the probability value. The confidence score may be derived based on the probability value and one or more of the first parameters, the second parameters, and the stated factors. In one simplified embodiment, the confidence score is set equal to the probability value.

In one embodiment, the predetermined distribution may be a hypergeometric distribution. As an example, equation 1 may be used, where: P is the probability that one or more VMs and/or PMs of a customer (or first set of attacked entities) has been targeted; X is a random variable; k is a number of alerts for the one or more VMs and/or PMs (or a number of observed successes); N is a total number of alerts (or population size) stored in, for example, the alert data storage 70; K is a number of alerts for the one or more attacking entities attacking the first set of one or more attacked entities; n is a number alerts for the first set of attacked entities (or a number of draws), and $$\binom{a}{b}$$

is a binomial coefficient, where a is K, N−K, or N and b is k, n−k, or n.

$$P(X=k) = \frac{\binom{K}{k}\binom{N-K}{n-k}}{\binom{N}{n}} \quad (1)$$

At 218, the security application 42 and/or the evaluation processor 66 via the targeting evaluation code 52 determines whether a targeted attack has occurred on the first set of attacked entities based on results of the evaluation performed at 216. As an example, when the probability of the first set of attacked entities (or P-value) is above a predetermined threshold, then it is determined that a targeted attack has likely occurred. If the probability of the first set of attacked entities (or P-value) is less than or equal to the predetermined threshold, then it is determined that a targeted attack has likely not occurred. If a targeted attack has likely occurred, then operation 220 is performed, otherwise operation 222 may be performed.

In another embodiment, the security application 42 and/or the evaluation processor 66 via the targeting evaluation code 52 determines an overall severity score of the targeted attack. The severity score indicates how bad is the targeted attack and whether the targeted attack succeeded in accessing private information, obtaining control of an attacked machine, degrading operation of the attacked machine, etc. The overall severity score may be determined based on an alert baseline severity, duration of the attack, amount of data/traffic associated with the attack, and/or other statistical information. The baseline severity may be a predetermined baseline value and/or a value predetermined based on attacks on the other entities by the one or more attacking entities of concern and/or other attacking entities accessing the cloud-based network 25. In one embodiment, the severity value is a value stored as part of a table relating severity values to statistical values. As another example, the severity value may be determined via a severity algorithm and/or a severity function. The severity value may be determined as a function of the statistical values.

The overall severity score may also be determined based on a specificity value. The specificity value indicates how targeted is the attack. For example, if the attack is directed solely at a customer machine, a set of machines of a customer, or machines of multiple customers, the specificity value is different. The specificity value may be determined based on the above-stated parameters, factors, and/or other related statistical information. In one embodiment, the specificity value is a level value, where each level indicates whether the targeted attack is directed to one of, for example, a user, a user machine, a business, a set of machines, an industry, a geographical area, etc. In one embodiment, a P-value, a confidence score, and/or a severity value are determined for each specificity level.

As an example, an amount of traffic to the first one or more attacked entities from the one or more attacking entities is compared to the amount of traffic to other attacked entities and/or non-attacked entities from the one or more attacking entities. If there is more traffic to the first one or more attacked entities, then a targeted attack is more likely to have occurred. If the number of attacks by the one or more attacking entities on the first set of one or more attacked entities is higher than the number of attacks by the one or more attacking entities on the other attacked entities, then a targeted attack is more likely to have occurred. The security application 42 and/or the evaluation processor 66 may determine based on the attacks experienced by the other attacked entities, a baseline or predicted number of attacks that should have been experienced by the first one or more attacked entities. For example, if a mean (or average) number of attacks with a certain deviation amount is expected for the first one or more attacked entities and the actual number of attacks is more than a predetermined number of the deviations higher, then a targeted attack is more likely to have occurred.

As another example, attack rates of customer machines in the cloud-based network 25 may be monitored and when more alerts are provided to customer machines associated with a certain subscription than alerts for other machines operating in the cloud-based network 25, then a targeted attack is likely. A targeted attack can be reflected in a time perspective (e.g., a tenant is being attacked for a longer duration than other tenants). A targeted attack can be reflected in a quantity perspective (e.g., more assets of the tenant are being attacked than assets of other tenants).

The security application 42 may execute a classification algorithm to identify targeted attacks. The classification algorithm may include comparing a total number of alerts associated with one or more attacking entities to a fraction of these alerts focused on a certain tenant to provide a ratio. The classification algorithm may then determine a probability that the stated ratio is to occur at random after correcting for one or more of the stated co-factors.

Compared to an on premise infrastructure, the security application 42 is better able to monitor attacks experienced by all machines within the cloud-based network 25. The information collected in association with the attacks is used to reveal intentions of attackers and distinguish between two types of attacks non-targeted attacks searching for security vulnerabilities in any customer and targeted attacks in which the attacker is interested in penetrating machines of, for example, a specific tenant. By monitoring an attack pattern of the attacker over the whole cloud-based network 25, the security application 42 and/or corresponding cloud service provider can distinguish between these two conditions and provide this valuable information to customers of the cloud service provider.

In another embodiment, the security application 42 and/or the evaluation processor 106 evaluates the density of the attacks by the one or more attacking entities on the first one or more attacked entities. The density refers to the number of attacks within a predetermined period of time. If the density is higher than the densities of attacks by the one or more attacking entities on the other attacked entities, then a targeted attack is more likely to have occurred.

As another example, a subset of machines (e.g., 100 machines) out of a total number of machines (e.g., 10,000 machines) may be evaluated. If the number of times the 100 machines have been attacked by the same one or more attacking entities are within a predetermined range of each other and/or the densities of attacks experienced by the 100 machines are within a second predetermined range of each other, than it is unlikely that a targeted attack has occurred. The opposite is true if there are one or more outliers, where an outlier refers to an attacking entity that has conducted a larger number of attacks and/or has a larger corresponding density of attack value. If the number of attacks and/or density value of an outlier are more than a predetermined number of the deviations from the mean, then it is more likely that a targeted attack has occurred.

As another example, if the probability that a certain subscription during a certain period of time is to experience an attack is higher than 50% and an attack is experienced, then the attack may not be a targeted attack. If a subset of machines (e.g., 100 machines) out of a total number of machines (e.g., 10,000 machines) is evaluated and more than a predetermined number of the machines are experiencing similar attacks, then the likelihood that a targeted attack has occurred is low.

As yet another example, if an attacked industry is being attacked more than other industries, but a machine in the attacked industry is not being attacked more than other machines in the attacked industry, then the attacked industry is experiencing a targeted attack and not the machine in the attacked industry. The different types of targeted attacks can be reported at 220.

At 220, the security application 42 and/or the incident reporting processor 68 via the CM code 58 performs one or more countermeasures. This includes generating a second alert indicating that a targeted attack has occurred, the likelihood a targeted attack has occurred, and/or any of the above stated parameters, risk values, factors, and/or other statistical information associated with the targeted attack. The second alert may be reported in a similar manner as the alerts generated at 208. Other countermeasures may also be performed similar to the countermeasures performed at 208 to block the targeted attack. This may include reporting parameters and/or results of the evaluation performed at 216.

The second alert may be reported independent of a severity level of a corresponding first alert reported at 208. The severity level of the first alert is not necessarily an indicator of a targeted attack as is the second alert. In one embodiment, the user, tenant, and/or owner of the one or more VMs and/or PMs attacked may not be provided with the information used to determine the specificity of the attack. This increases importance in reporting the second alert indicating that a targeted attack has occurred and/or the likelihood that a targeted attack has occurred. The specificity of the attack is an indicator of the likelihood that a targeted attack has occurred. In another embodiment, the second alert includes the overall severity score determined at 218.

At 222, the security application via the countermeasure code 58 may report the parameters and/or results of the evaluation performed at 216 similar to the operation 210 of reporting the parameters, anomalies and/or other related statistical information. The method may end at 224.

Figure 5:
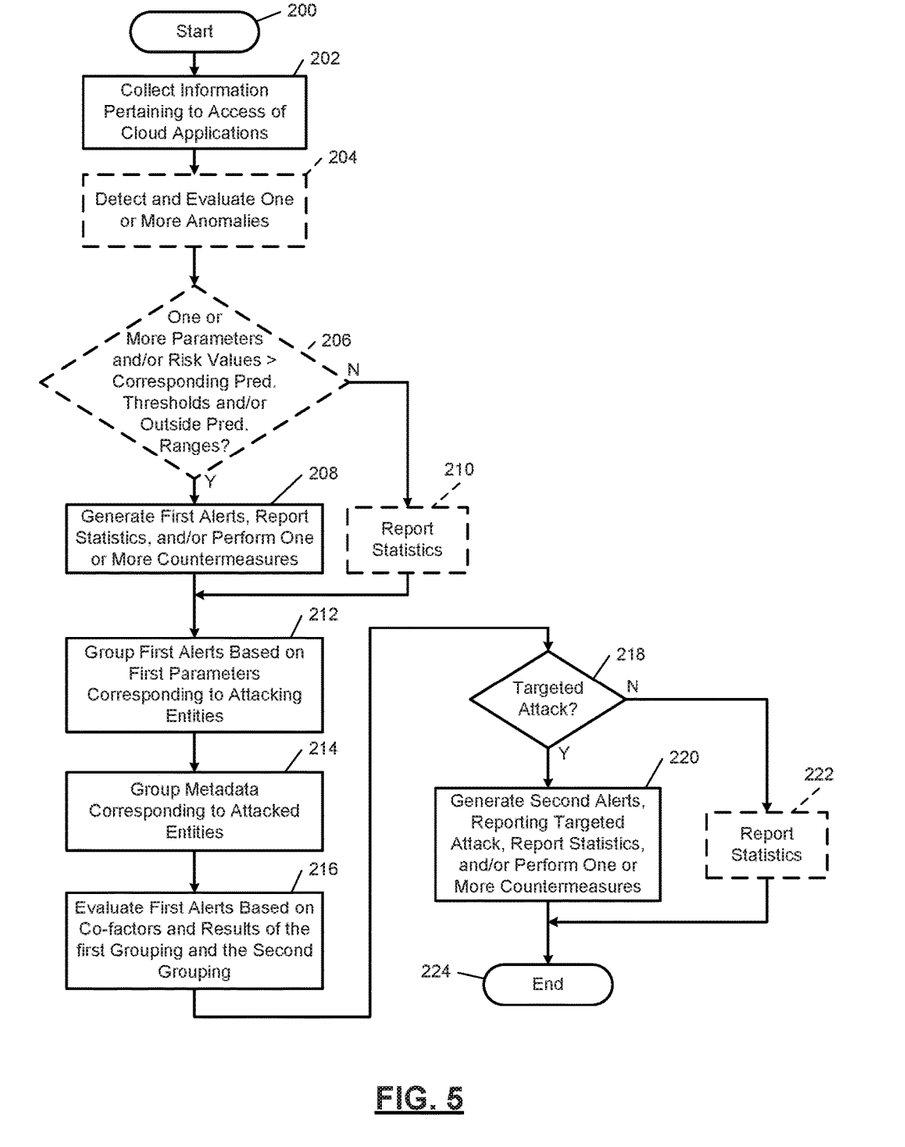
FIG. 5 illustrates a targeting detection method in accordance with an embodiment of the present disclosure.

The above-described operations of FIG. 5 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The above-disclosed embodiments include determining whether a targeted attack has occurred on a first customer machine in a cloud-based network based on information provided in alerts for one or more other machines in the cloud-based network.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element; such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for detecting a directed targeted attack by a first machine on a second machine, wherein the second machine is implemented in a server computer of a service provider, the system comprising:
a processor;
a memory; and
an application stored in the memory and including instructions, which are executable by the processor and that are configured to
according to a first one or more parameters, group alerts for a first plurality of machines, wherein the first plurality of machines include the first machine, wherein each group of alerts corresponds to attacks performed by a respective one of the first plurality of machines, and wherein each of the alerts is indicative of a possible attack performed by one of the first plurality of machines on one or more cloud applications implemented by a second plurality of machines,
according to a second one or more parameters, group metadata corresponding to the second plurality of machines implementing the cloud applications, wherein the second plurality of machines include the second machine,
based on the group of metadata corresponding to the second machine and one or more co-factors, evaluate one or more alerts corresponding to attacks performed by the first machine on the second machine relative to at least one of (i) alerts associated with attacks performed by the first machine on other ones of the second plurality of machines other than the second machine, or (ii) alerts associated with attacks performed by the first plurality of machines,
while evaluating the one or more alerts, determining whether the second machine is more likely to be attacked than the other ones of the second plurality of machines including determining whether at least one of (i) a higher probability exists that an attack on the second machine is to occur than an attack on the other ones of the second plurality of machines, or (ii) a number or level of attacks on the second machine is higher than a number or level of attacks on the other ones of the second plurality of machines, and
alert the second machine of the directed targeted attack if at least one of (i) a higher probability exists that an attack on the second machine is to occur than an attack on the other ones of the second plurality of machines, or (ii) the number or level of attacks on the second machine is higher than the number or level of attacks on the other ones of the second plurality of machines.

2. The system of claim 1, wherein the one or more alerts corresponding to the attacks performed by the first machine on the second machine are evaluated relative to attacks performed by the first machine on other ones of the second plurality of machines, wherein the other ones of the second plurality of machines do not include the second machine.

3. The system of claim 1, wherein the one or more alerts corresponding to the attacks performed by the first machine on the second machine are evaluated relative to attacks performed by other ones of the first plurality of machines on at least one of the second machine or other ones of the second plurality of machines, wherein the other ones of the first plurality of machines do not include the first machine, and wherein the other ones of the second plurality of machines do not include the second machine.

4. The system of claim 1, wherein:
evaluating the one or more alerts corresponding to the attacks performed by the first machine on the second machine includes determining a probability value that the attacks performed by the first machine on the second machine are to occur based on (i) the alerts associated with the attacks performed by the first machine on the other ones of the second plurality of machines, or (ii) the alerts associated with the attacks performed by the first plurality of machines; and
alerting the second machine of the directed targeted attack including alerting the second machine of the probability value.

5. The system of claim 4, further comprising determining at least one of a severity value or a confidence score corresponding to the probability value,
wherein alerting the second machine of the directed targeted attack includes the severity value and the confidence score.

6. The system of claim 4, wherein the probability value is determined based on at least one of:
anomalies corresponding to the alerts associated with the attacks performed by the first machine on the second machine;
anomalies corresponding to the alerts associated with the attacks performed by the first machine on the other ones of the second plurality of machines; or
anomalies detected subsequent to grouping the alerts for the first plurality of machines and grouping the metadata corresponding to the second plurality of machines.

7. The system of claim 4, wherein the probability value is determined based on a hypergeometric distribution.

8. The system of claim 1, wherein alerting the second machine of the directed targeted attack includes informing the second machine of a specificity level of the directed targeted attack.

9. The system of claim 1, wherein the co-factors include the first one or more parameters and the second one or more parameters.

10. The system of claim 1, wherein the first one or more parameters include at least one of an Internet protocol address of the first machine, an identifier of an attacking tool used by the first machine, or a value indicating an attacking pattern corresponding to the directed targeted attack.

11. The system of claim 1, wherein the second one or more parameters include at least one of a identifier of a tenant, an identifier of a subscription, an identifier of a domain of operation, an identifier of an industry, or an identifier of a geographical area of origin.

12. The system of claim 1, wherein the co-factors include at least one of an Internet protocol continuity value, a malware type, a list of known attackers, a size of a tenant of the second machine, a geographical area of the first machine, or a geographical area of the second machine.

13. The system of claim 1, wherein each of the first machine, the second machine, the first plurality of machines and the second plurality of machines is a virtual machine or a physical machine.

14. The system of claim 1, wherein the second plurality of machines includes one or more of the first plurality of machines.

15. A system for detecting a directed targeted attack by a first set of machines on a second set of machines, wherein the second set of machines are implemented in a cloud-based network of a service provider, the system comprising:
a processor;
a memory; and
an application stored in the memory and including instructions, which are executable by the processor and that are configured to
according to a first one or more parameters, group alerts for a first plurality of machines, wherein the first plurality of machines include the first set of machines, wherein each group of alerts corresponds to attacks performed by a respective one of the first plurality of machines, and wherein each of the alerts is indicative of a possible attack performed by one of the first plurality of machines on one or more cloud applications implemented by a second plurality of machines,
according to a second one or more parameters, group metadata corresponding to the second plurality of machines implementing the cloud applications, wherein the second plurality of machines include the second set of machines,
based on the group of metadata corresponding to the second set of machines, and one or more co-factors, evaluate one or more alerts corresponding to attacks performed by the first set of machines on the second set of machines relative to at least one of (i) alerts associated with attacks performed by the first set of machines on other ones of the second plurality of machines other than the second set of machines, or (ii) alerts associated with attacks performed by the first plurality of machines,
while evaluating the one or more alerts, determining whether the second set of machines is more likely to be attacked than the other ones of the second plurality of machines including determining whether at least one of (i) a higher probability exists that an attack on the second set of machines is to occur than an attack on the other ones of the second plurality of machines, or (ii) a number or level of attacks on the second set of machines is higher than a number or level of attacks on the other ones of the second plurality of machines, and
alert a customer associated with the second set of machines of the directed targeted attack if at least one of (i) a higher probability exists that an attack on the second machine is to occur than an attack on the other ones of the second plurality of machines, or (ii) the number or level of attacks on the second machine is higher than the number or level of attacks on the other ones of the second plurality of machines.

16. The system of claim 15, wherein:
the first one or more parameters include an Internet protocol address of the first machine, an identifier of an attacking tool used by the first machine, and a value indicating an attacking pattern corresponding to the directed targeted attack; and
the second one or more parameters include at least one of an identifier of a tenant, an identifier of a subscription, an identifier of a domain of operation, an identifier of an industry, or an identifier of a geographical area of origin.

17. The system of claim 15, wherein:
the first set of machines includes one or more machines; and
the second set of machines includes two or more machines.

18. A non-transitory tangible computer readable medium storing instructions executable by a processor for detecting a directed targeted attack by a first machine on a second machine, wherein the second machine is implemented in a server computer, and wherein the server computer is implemented in a cloud-based network of a service provider, the instructions are for:
according to a first one or more parameters, grouping alerts for a first plurality of machines, wherein the first plurality of machines include the first machine, wherein each group of alerts corresponds to attacks performed by a respective one of the first plurality of machines, and wherein each of the alerts is indicative of a possible attack performed by one of the first plurality of machines on one or more cloud applications implemented by a second plurality of machines;
according to a second one or more parameters, grouping metadata corresponding to the second plurality of machines implementing the cloud applications, wherein the second plurality of machines include the second machine;
based on the group of metadata corresponding to the second machine and one or more co-factors, evaluating one or more alerts corresponding to attacks performed by the first machine on the second machine relative to at least one of (i) alerts associated with attacks performed by the first machine on other ones of the second plurality of machines other than the second machine, or (ii) alerts associated with attacks performed by the first plurality of machines;
while evaluating the one or more alerts, determining whether the second machine is more likely to be attacked than the other ones of the second plurality of machines including determining whether at least one of (i) a higher probability exists that an attack on the second machine is to occur than an attack on the other ones of the second plurality of machines, or (ii) a number or level of attacks on the second machine is higher than a number or level of attacks on the other ones of the second plurality of machines; and
alerting the second machine of the directed targeted attack if at least one of (i) a higher probability exists that an attack on the second machine is to occur than an attack on the other ones of the second plurality of machines, or (ii) the number or level of attacks on the second machine is higher than the number or level of attacks on the other ones of the second plurality of machines.

19. The non-transitory tangible computer readable medium of claim 18, wherein the instructions are further for:
determining a probability value that the attacks performed by the first machine on the second machine are to occur based on (i) the alerts associated with the attacks performed by the first machine on the other ones of the second plurality of machines, or (ii) the alerts associated with the attacks performed by the first plurality of machines; and
determining at least one of a severity value or a confidence score corresponding to the probability value,
wherein alerting the second machine of the directed targeted attack includes the probability value, the severity value and the confidence score.

20. The non-transitory tangible computer readable medium of claim 18, wherein alerting the second machine of the targeted attack includes informing the second machine of a specificity level of the directed targeted attack.

21. The system of claim 1, wherein:
the instructions are configured to, based on the result of the evaluation, perform a countermeasure to block the directed targeted attack; and
the countermeasure includes the alerting of the second machine of the directed targeted attack.

22. The system of claim 1, wherein:
the first one or more parameters comprise a plurality of parameters;
the alerts for the first plurality of machines are grouped according to each of the plurality of parameters; and
the attacking entities include the first machine.

23. The system of claim 1, wherein:
the first one or more parameters comprise a plurality of parameters;
the alerts for the first plurality of machines are grouped according to each of the plurality of parameters.

24. The system of claim 1, wherein:
the second one or more parameters comprise a plurality of parameters;
the metadata is grouped according to each of the plurality of parameters; and
the attacking entities include the first machine.

25. The system of claim 1, wherein:
the metadata includes a plurality of types of data;
the one or more alerts corresponding to attacks performed by the first machine on the other ones of the second plurality of machines are evaluated based on each of the plurality of types of data; and
the entities being include the second machine.

26. The system of claim 1, wherein:
the one or more co-factors include a plurality of co-factors;
the one or more alerts corresponding to attacks performed by the first machine on the other ones of the second plurality of machines are evaluated based on each of the plurality of co-factors; and
the attacking entities include the first machine.

27. The system of claim 1, wherein:
the instructions are further configured to
determining a first probability that one or more attacks associated with the one or more alerts for the second machine is to occur,
determining a second probability that the one or more attacks for the second plurality of machines are to occur,
comparing the first probability to the second probability,
if the first probability is high compared to the second probability, then determining that a probability that the second machine has been targeted is low, and
if the first probability is low compared to the second probability, then determining that a probability that the second machine has been targeted is high; and
the second machine is alerted of the directed target attack based on a result of comparing the first probability to the second probability.

28. The system of claim 4, wherein:
the instructions are further configured to determine whether each of a plurality of anomalies exist; and
the probability value is determined based on existence of and values associated with the plurality of anomalies.

29. The system of claim 4, wherein:
the instructions are further configured to determine whether each of a plurality of anomalies exist; and
the probability value is determined based on existence of and values associated with the plurality of anomalies.

30. The system of claim 7, wherein the hypergeometric distribution is based on:
a probability that one or more machines of a customer has been targeted;
a number of alerts for the one or more machines of the customer;
a total number of alerts stored in a memory;
a number of alerts for the first machine;
a number of alerts for the second machine; and
a binomial coefficient.

31. The system of claim 1, wherein the instructions are further configured to:
collect the first one or more parameters and the second one or more parameters in association with the access of the cloud applications by the second plurality of machines;
detect anomalies associated with the access of the cloud applications by the second plurality of machines; and
generate the alerts based on the detected anomalies.

32. The system of claim 1, wherein the second machine is similar to the other ones of the second plurality of machines such that the second machine and the other ones of the second plurality of machines: share a same physical machine as the second machine; are for a same customer as the second machine; are in a same type of industry as the second machine; or are in a same geographical area as the second machine.

* * * * *